United States Patent
Lawson

(10) Patent No.: US 8,006,726 B2
(45) Date of Patent: Aug. 30, 2011

(54) TREE STUMP CORING APPARATUS AND METHOD

(76) Inventor: Aaron Lawson, Okotoks (CA)

( * ) Notice: Subject to any disclaimer, the term of this patent is extended or adjusted under 35 U.S.C. 154(b) by 76 days.

(21) Appl. No.: 12/487,237

(22) Filed: Jun. 18, 2009

(65) Prior Publication Data

US 2010/0319808 A1 Dec. 23, 2010

(51) Int. Cl.
*A01G 23/06* (2006.01)
(52) U.S. Cl. .................... 144/24.12; 144/335
(58) Field of Classification Search ............ 144/4.1, 144/24.12, 335
See application file for complete search history.

(56) References Cited

U.S. PATENT DOCUMENTS

| | | | | |
|---|---|---|---|---|
| 1,012,962 | A | * | 12/1911 | Anderson ............... 144/24.12 |
| 1,114,505 | A | * | 10/1914 | Moore et al. ............... 408/129 |
| 2,940,487 | A | * | 6/1960 | O'Neill et al. ............ 144/24.12 |
| 3,760,515 | A | * | 9/1973 | Morgan ..................... 37/302 |
| 4,067,369 | A | * | 1/1978 | Harmon ..................... 144/34.1 |
| 4,637,442 | A | * | 1/1987 | Mozer ..................... 144/24.12 |
| 4,921,024 | A | | 5/1990 | Wiemeri et al. |
| 4,987,935 | A | | 1/1991 | Corcoran et al. |
| 5,671,788 | A | | 9/1997 | Rewis |
| 5,921,302 | A | | 7/1999 | Petersen |
| 6,152,201 | A | | 11/2000 | Kurelek |
| 6,176,280 | B1 | | 1/2001 | DiSabatino et al. |
| 7,007,414 | B2 | | 3/2006 | Paumier |
| 7,007,730 | B2 | | 3/2006 | Wildey |
| 7,017,631 | B2 | | 3/2006 | Fenton et al. |
| 7,228,880 | B2 | | 6/2007 | Taillon |
| 7,306,018 | B2 | | 12/2007 | Hicks et al. |
| 2003/0159757 | A1 | | 8/2003 | Tingstad |
| 2007/0181217 | A1 | | 8/2007 | Ahdoot |
| 2008/0099102 | A1 | | 5/2008 | Trom |

* cited by examiner

*Primary Examiner* — Shelley Self
(74) *Attorney, Agent, or Firm* — Maxey Law Offices, PLLC; Stephen Lewellyn

(57) ABSTRACT

A tree stump coring apparatus and method of coring a tree stump using the same is provided. The tree stump coring apparatus includes an elongated cylindrical cutting blade of a hollow tubular body rotatable about a vertical axis with cutting blades on an open lower end of the cutting blade for mounting on a vehicle such as a skid steer loader which provides a means to rotate the cutting blade and a means to move the cutting blade in a generally vertical direction downwardly to core a tree stump and upwardly to remove the tree stump core from the ground.

5 Claims, 4 Drawing Sheets

TREE STUMP CORING APPARATUS AND METHOD

FILED OF THE INVENTION

The present invention relates generally to tree stump removal, and more particularly, relating to a tree stump coring apparatus and method for coring a tree stump from attached roots with an cylindrical cutting blade rotatable about a vertical axis.

BACKGROUND OF THE INVENTION

Once a tree is cut down a problem resides in removal of the tree stump. There are several methods available for removing tree stumps. Mechanical removal tends to be the most efficient and quickest method. Mechanical removal includes grinding the tree stump away with tree stump grinding machines having a cutting head comprising a large rotating disc equipped with cutting teeth. An operator moves the cutting head over the stump grinding it away little-by-little. There are horizontal axis stump grinders where the cutter rotates about a horizontal axis of rotation, and vertical axis stump grinders where the cutter rotates about a vertical axis of rotation. Stump grinders have a disadvantage of being a relatively dangerous piece of equipment to operate and exposing the operator to the possibility of great injury. Additionally, stump grinders have a tendency to throw debris which may include stones out of the hole in the ground which constitutes a safety problem. Horizontal axis stump grinders further have a disadvantage of positioning the drive shaft and bearings below ground level while being moved through the stump and exposing them to dirt and rocks. Additionally, relatively large discs are required in order to grind deep enough to remove the roots of medium and large stumps. Large diameter disc cutters require more power which cannot be supplied by small horsepower vehicles. Vertical axis stump grinders have solved several of the problems of horizontal axis cutters, but disadvantages still remain, including the throwing of debris.

An alternative, and often a less than desirable method includes decomposition of the tree stump. If left alone after tree removal, the stump will gradually decay in the ground, from natural fungus and bacteria. This process can take from one to several years, depending on the size of the stump, the species of tree, and the soil conditions. Commercial chemical products are available that are marketed as increasing the decomposition rate of tree stumps. However, few, if any of these products decompose the stump much faster than natural decay processes. The decomposition method has the obvious disadvantage in the time required for the tree stump to decay.

Another alternative method of tree stump removal is digging the tree stump out. Large equipment such as a backhoe can accomplish the job efficiently, for smaller stumps. However, hand digging the stump can be very difficult, even for the stumps of small trees. Digging is limited only to smaller tree stumps, and is labor intensive and time consuming.

Yet another alternative method of tree stump removal is pulling the tree stump from the ground. Pulling is undesirable as it is limited to very small tree stumps, requires attaching the tree stump to a vehicle by rope or chain, and generally results in tearing and lifting the root system upward along with the stump. An uplifted root system can damage adjacent structures and vegetation, and result in additional repair work or work to remove the root system.

SUMMARY OF THE INVENTION

An object of the present invention is to provide a stump coring apparatus and method which does not throw debris during operation.

Another object of the present invention is to provide a stump coring apparatus and method where a stump is removed in one piece without tearing the roots.

Another object of the present invention is to provide a stump coring apparatus and method where a stump can be more safely removed over stump grinding methods.

Another object of the present invention is to provide a stump coring apparatus and method where none of the apparatus' critical components, such as bearings and drives shafts, are exposed to dirt and debris.

Another object of the present invention is to provide a stump coring apparatus and method where a stump can be efficiently removed.

Another object of the present invention is to provide a stump coring apparatus and method having replaceable cutting teeth.

To achieve these and other advantages, in general, in one aspect, a method of coring a tree stump from attached roots to permit removal of the tree stump from the earth is provided. The method includes the steps of (a) rotating a cylindrical cutting blade of a hollow tubular body having at one end an annular ring of cutting teething about a generally vertical axis of rotation; (b) moving the cylindrical cutting blade in a generally vertical downwardly direction over a tree stump having a diameter less than the inner diameter of the hollow tubular body with the tree stump positioned within the hollow tubular body; (c) urging the cutting teeth vertically downward into the attached roots to cut the roots from the tree stump forming a stump core; and (d) moving the cylindrical cutting blade and stump core in a generally vertical upwardly direction from within the earth.

In general, in another aspect, tree stump coring apparatus is provided. The tree stump coring apparatus includes a support to which a cylindrical cutting blade is mounted for rotation about a generally vertical axis of rotation. The cylindrical cutting blade is of a hollow tubular body having an open end. A power means is mounted on the support and is connected to the cylindrical cutting blade for rotating the cylindrical cutting blade. An annular ring of cutting teeth is mounted on the cylindrical cutting blade at the open end. A means is operable to move the support in a generally vertical direction towards a stump to urge said cylindrical cutting blade and said annular ring of cutting teeth into roots extending from the stump with the stump positioned interiorly of said hollow tubular body.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Reference will now be made in detail to the preferred embodiments of the present invention, examples of which are illustrated in the accompanying drawings.

Figure 1:
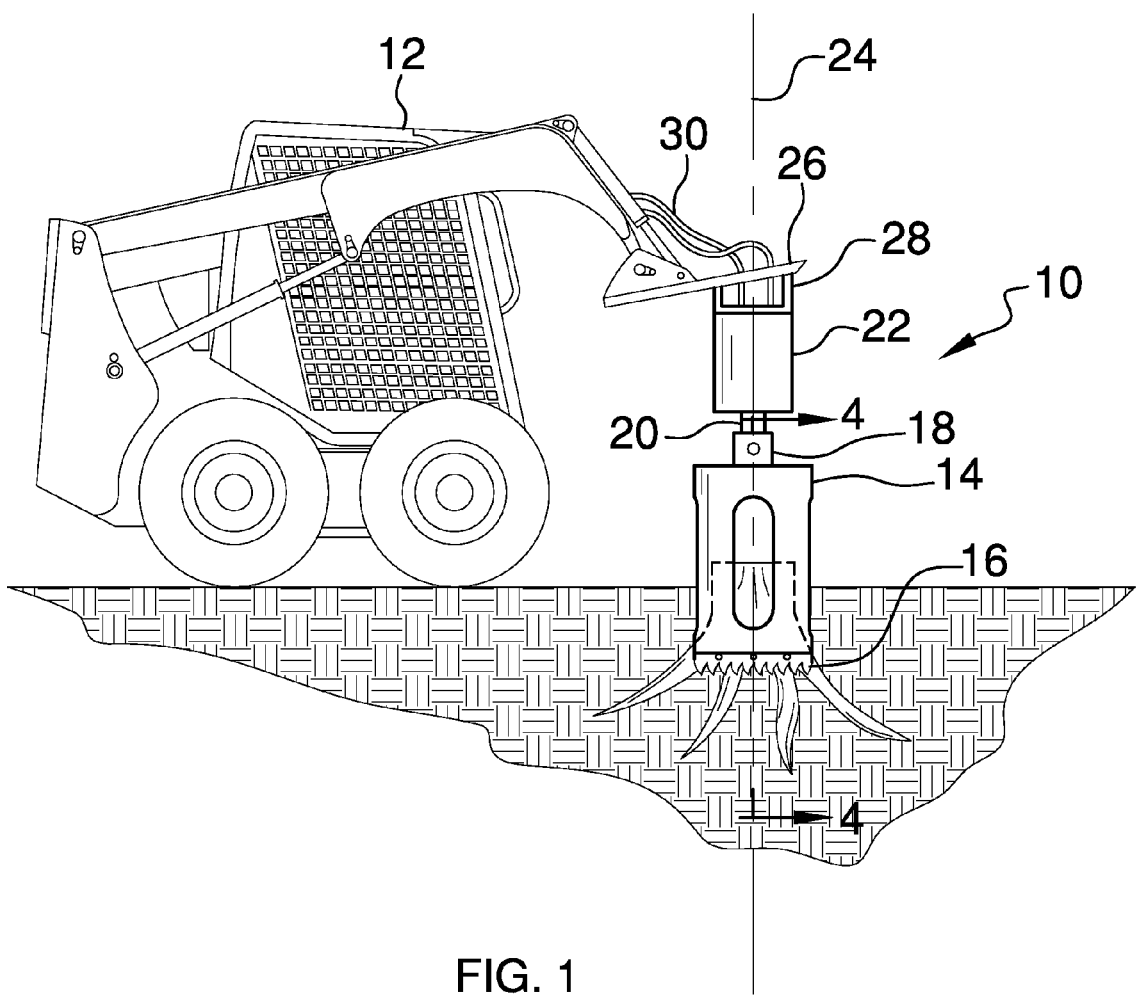
FIG. 1 is an illustrative view of a tree stump coring apparatus constructed in accordance with the principles of the present invention, mounted to a skid steer loader in use, and coring a stump to be removed from the ground.

FIG. 1 is an illustrative view of the stump coring apparatus 10 in accordance with the present invention in use and mounted on a conventional skid steer loader 12. The stump apparatus 10 includes a cylindrical cutting blade 14 of an elongated hollow tubular body. One end of the cutting blade 14 has an annular ring of cutting teeth 16. The opposite end of the cutting blade 14 includes a mandrel attachment 18. Mandrel attachment 18 is detachably connected to mandrel 20 of hydraulic motor 22 to couple the cutting blade 14 to the hydraulic motor for rotation about a generally vertical axis of rotation 24. The hydraulic motor 22 may be attached to movable beam 26 of the skid steer loader 12 by bracket 28. The beams of the skid steer loader are operable to move the cutting blade in a generally vertical direction. Hydraulic fluid pressure hose(s) 30 are connected to a hydraulic pump on the skid steer loader 12. The stump coring apparatus 10 may be attached to alternative equipment such as an articulated vehicle, an excavator, self propelled vehicle or a tow behind trailer which provide a source of adequate power including internal combustion engines, electrical power or the addition of a power-take-off hydraulic drive to rotate the cutting blade.

Figure 2:
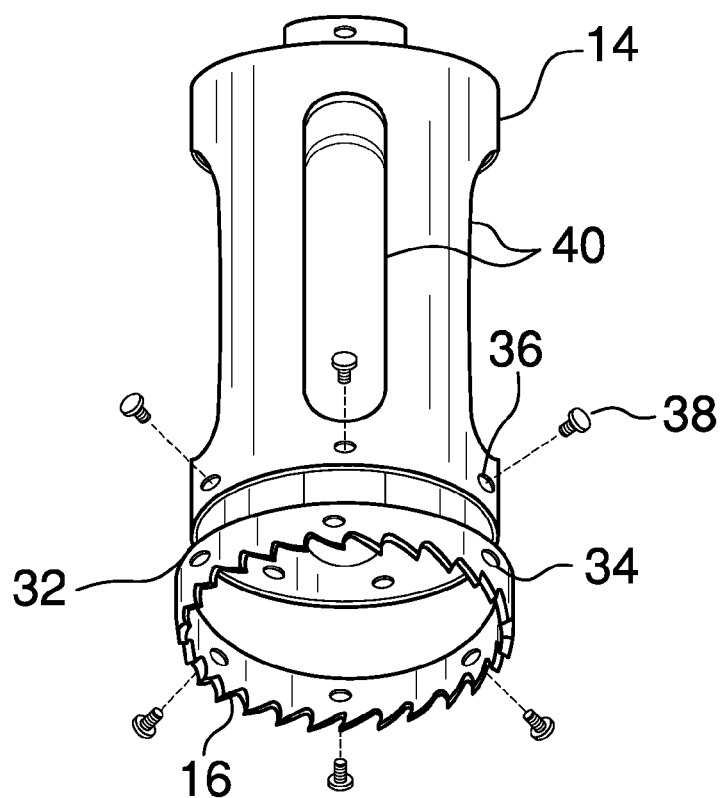
FIG. 2 is an exploded, bottom perspective view of a cylindrical cutting blade of the tree stump coring apparatus.

FIG. 2 is a bottom, explode perspective view of the cylindrical cutting blade 14. The annular ring of cutting teeth 16 is removably attached to open end 32 of the cutting blade 14. The annular ring of cutting teeth 16 includes a plurality of bolt holes 34 spaced around the circumference thereof. Open end 32 includes a plurality of bolt holes 36 spaced around the circumference thereof to correspond to bolt holes 34. Threaded fasteners, such as bolts 38 are inserted through bolt holes 34 and threaded into bolt holes 36 to secure the annular ring of cutting teeth 16 the cutting blade 14. In one alternative method, the annular ring of cutting teeth 16 could be threadably attached to open end 32. A plurality of longitudinal slots 40 can be formed through the side wall of the cutting blade 14 to permit easier removal of a stump core from the interior of the cutting blade.

Figure 3:
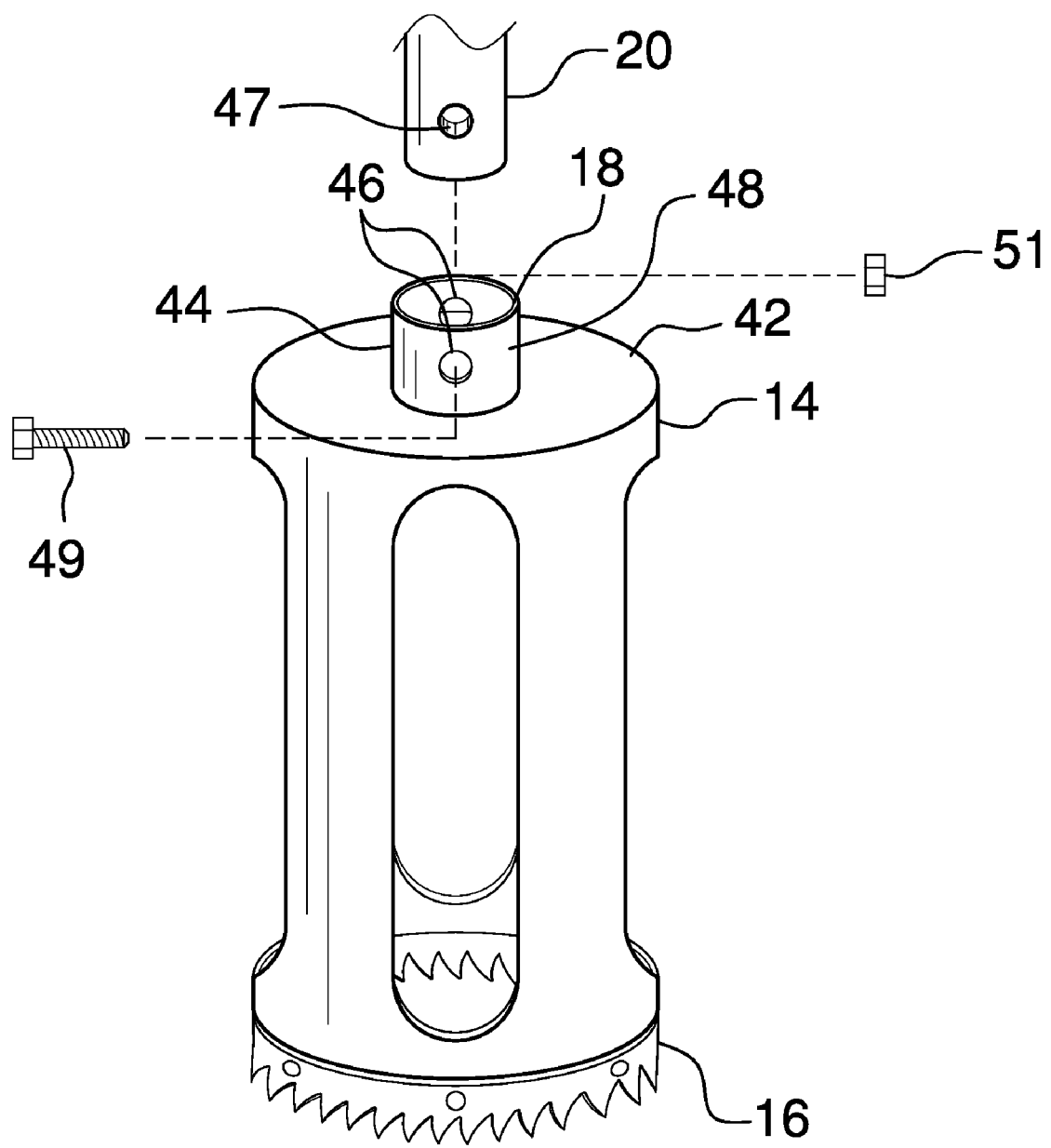
FIG. 3 is a top perspective view of the cylindrical cutting blade.

FIG. 3 is a top perspective view of the cylindrical cutting blade 14. The mandrel attachment 18 extends from closed end 42 of the cutting blade 14 and includes a cylindrical tube 44 having aligned bolt holes 46 formed through opposite sides of the sidewall 48 of the tube 44. Mandrel 20 has a cooperating through hole 47 which is aligned with bolt holes 46 when inserted into tube 44. The mandrel 20 is secured to mandrel attachment 18 by passing a threaded bolt 49 through holes 46 and 47 and securing the bolt with a nut 51. Alternatively, other mandrel attachment structures could be substituted to permit attachment of the cutting blade 14 to a mandrel of a rotary power source.

Figure 4:
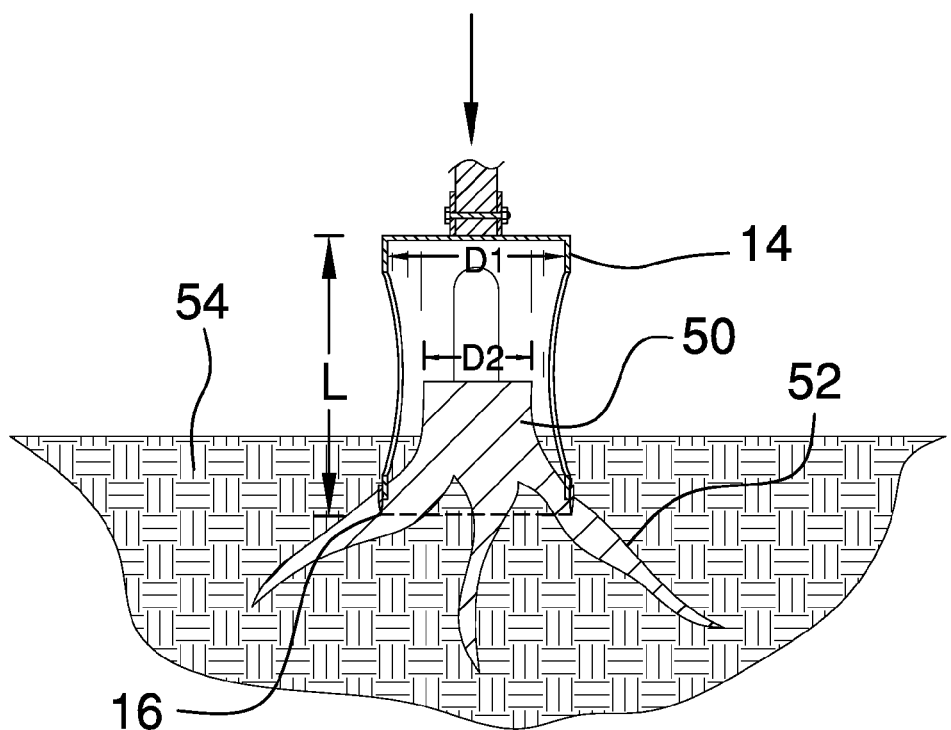
FIG. 4 is a cross-sectional view of the tree stump coring apparatus in use and being moved vertically downward into the roots of a tree stump to core the tree stump from attached roots.

FIG. 4 is a cross-sectional view of the stump removing apparatus 10 in use forming a stump core from a stump 50 and attached roots 52 to permit removal of the stump from the earth 54. As shown here, the cutting blade 14 is being moved in a generally vertical and downwardly direction over a stump 50 such that the stump is positioned within the cutting blade 14. The cutting blade 14 is chosen to have an inner diameter D1 greater than the diameter of the stump D2 to prevent the cutting blade from binding against the side of the stump. Further, the cutting blade 14 is chosen of have a length L greater than the length of the stump. While the cutting blade 14 is rotated it is moved downwardly urging the cutting teeth 16 into the roots 52 of the stump cutting them from the stump and forming a stump core.

Figure 5:
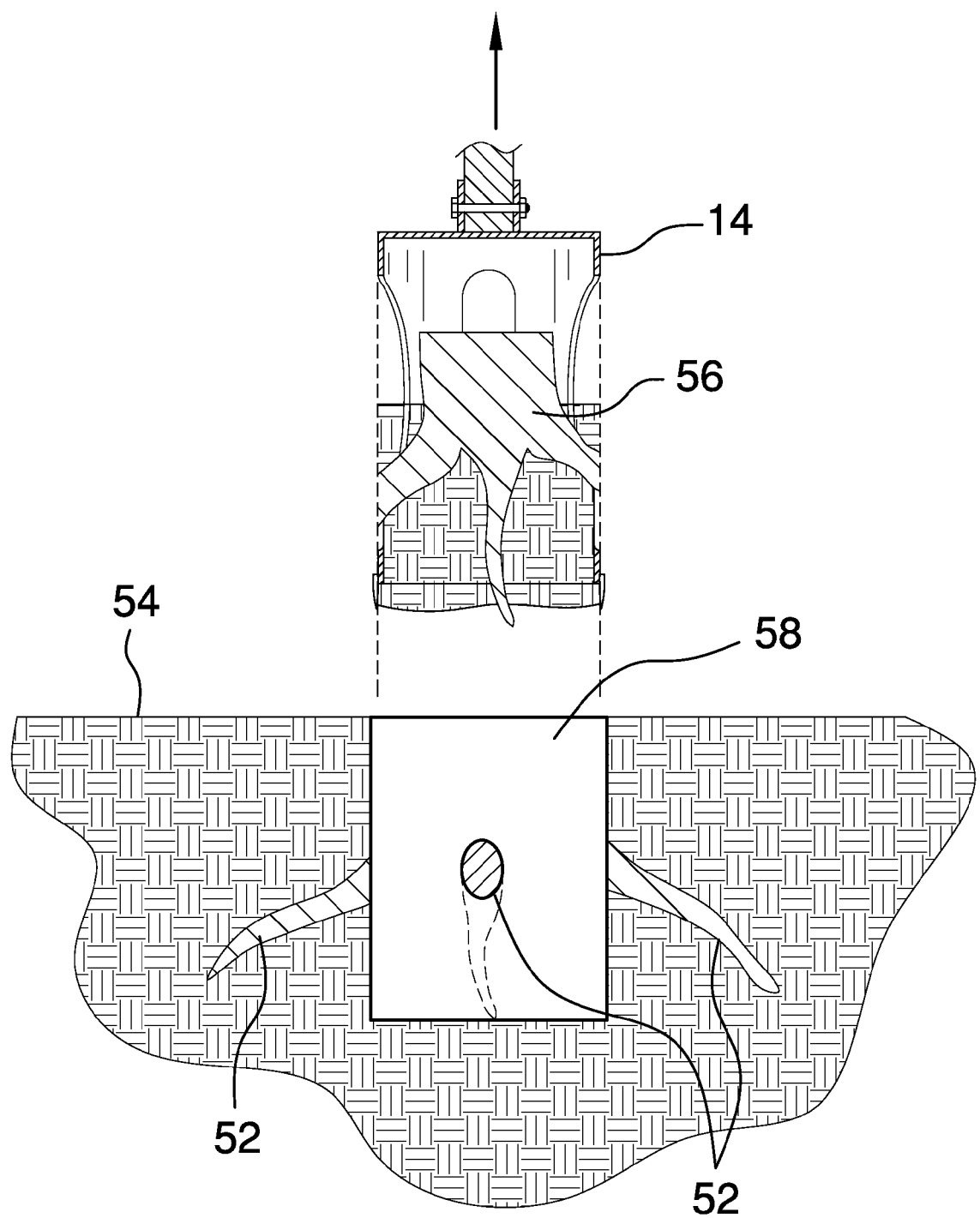
FIG. 5 is a cross-section view of the tree stump coring apparatus in use and being moved vertically upward removing a tree stump core cut from attached roots.

FIG. 5 is a cross-sectional view of the stump removing apparatus 10 in use and being moved in a generally vertical upward direction from the earth 54. As shown, once the cutting blade 14 has cut through roots 52, the cutting blade is moved in an upwardly direction taking therewith a stump core 56 cut from the stump and the roots. Once the cutting blade 14 is completely lifted removing the stump core 56 from the earth, a generally cylindrical hole 58 is left in place, which can be filled with loose earth.

A number of embodiments of the present invention have been described. Nevertheless, it will be understood that various modifications may be made without departing from the spirit and scope of the invention. Accordingly, other embodiments are within the scope of the following claims.

What is claimed is:

1. A method of coring a tree stump from attached roots to permit removal of the tree stump from within the earth, the method comprising:

(a) rotating a cylindrical cutting blade of a hollow tubular body having at one end an annular ring of cutting teething about a generally vertical axis of rotation;

(b) moving the cylindrical cutting blade in a generally vertical downwardly direction over a tree stump having a diameter less than the inner diameter of said hollow tubular body with the tree stump positioned within said hollow tubular body;

(c) urging said cutting teeth vertically downward into the attached roots to cut the roots from the tree stump forming a stump core; and (d) moving the cylindrical cutting blade and stump core in a generally vertical upwardly direction from within the earth.

2. The method of claim 1, wherein step (d) the stump core and the cylindrical cutting blade are moved together.

3. A method of coring a tree stump from attached roots to permit removal of the tree stump from within the earth with a cylindrical cutting blade of a hollow tubular body having at one end an annular ring of cutting teeth, the method comprising:

(a) supporting said cylindrical cutting blade on a support for rotation about a vertical axis, said support being mounted on a skid steer loader;

(b) rotating said cylindrical cutting blade power means connected to said cylindrical cutting blade;

(c) moving the cylindrical cutting blade in a generally vertical downwardly direction over a tree stump having a diameter less than the inner diameter of said hollow tubular body with the tree stump positioned within said hollow tubular body;

(d) urging said cutting teeth vertically downward into the attached roots to cut the roots from the tree stump forming a stump core; and (e) moving the cylindrical cutting blade and stump core in a generally vertical upwardly direction from within the earth.

4. A tree stump coring apparatus, comprising:

a support, said support including a movable beam of a vehicle;

a cylindrical cutting blade mounted on said support for rotation about a generally vertical axis of rotation, said cylindrical cutting blade of a hollow tubular body having an open end;

power means for rotating said cylindrical cutting blade, said power means mounted on said support and connected to said cylindrical cutting blade;

an annular ring of cutting teeth mounted on said cylindrical cutting blade at said open end; and means to move said support in a generally vertical direction towards a stump to urge said cylindrical cutting blade and said annular ring of cutting teeth into roots extending from the stump with the stump positioned interiorly of said hollow tubular body.

5. The tree stump coring apparatus of claim 4, wherein said annular ring of cutting teeth is removably attached to said open end.

* * * * *